(12) United States Patent
Weinhold

(10) Patent No.: US 7,195,288 B2
(45) Date of Patent: Mar. 27, 2007

(54) PIPE COUPLING

(76) Inventor: Karl Weinhold, Im Jaqdfeld 43, Neuss (DE) D-41464

( * ) Notice: Subject to any disclaimer, the term of this patent is extended or adjusted under 35 U.S.C. 154(b) by 0 days.

(21) Appl. No.: 11/008,070

(22) Filed: Dec. 9, 2004

(65) Prior Publication Data
US 2005/0099007 A1 May 12, 2005

Related U.S. Application Data

(63) Continuation of application No. 10/254,561, filed on Sep. 25, 2002, now abandoned, which is a continuation of application No. 09/620,674, filed on Jul. 20, 2000, now abandoned, which is a continuation of application No. 09/047,757, filed on Mar. 25, 1998, now abandoned.

(30) Foreign Application Priority Data
Mar. 28, 1997 (DE) ................. 197 13 202

(51) Int. Cl.
F16L 19/00 (2006.01)
F16L 33/18 (2006.01)
(52) U.S. Cl. ...................... 285/354; 285/351
(58) Field of Classification Search ............... 285/354, 285/351
See application file for complete search history.

(56) References Cited

U.S. PATENT DOCUMENTS

| 217,643 | A | * | 7/1879 | Schmidt | 285/89 |
| 323,834 | A | | 8/1885 | Turner | |
| 495,513 | A | * | 4/1893 | Pierce | 285/52 |
| 1,814,480 | A | * | 7/1931 | Metcalf, Jr. et al. | 285/323 |
| 1,823,553 | A | * | 9/1931 | Metcalf, Jr. | 285/323 |
| 1,875,266 | A | | 8/1932 | Santiago | |
| 2,477,677 | A | * | 8/1949 | Woodling | 285/281 |
| 2,532,669 | A | * | 12/1950 | Jones | 285/106 |
| 2,833,568 | A | | 5/1958 | Corsette | |
| 2,867,463 | A | * | 1/1959 | Snider | 277/612 |
| 2,988,385 | A | * | 6/1961 | Foelester et al. | 285/179 |
| 3,285,627 | A | | 11/1966 | Kozulla et al. | |
| 3,510,155 | A | | 5/1970 | Jacobus | |
| 3,615,109 | A | | 10/1971 | Brinda | |
| 3,695,642 | A | | 10/1972 | DeWoody | |
| 3,712,583 | A | | 1/1973 | Martindale et al. | |

(Continued)

FOREIGN PATENT DOCUMENTS

CH 0374254 * 2/1964 ................. 285/351

(Continued)

Primary Examiner—James M. Hewitt
(74) Attorney, Agent, or Firm—Greenberg Traurig LLP

(57) ABSTRACT

The invention relates to a pipe coupling comprising a socket component and an insert component which is partially insertable to securely fit into the socket component. A ring groove between the socket component and the insert component is sealed by a ring seal. The socket component is releasably connected to the insert component by means of a union nut which contacts a shoulder of the insert component rearwardly for joined movement into the closed position. The union nut is screwed onto the socket component along a cylindrical and/or conical exterior thread. The ring gap between the union nut and the insert component is sealed. The ring gap between the union nut and the socket component is also sealed. The thread connection between the socket component and the union nut is positioned between the two sealing positions.

2 Claims, 1 Drawing Sheet

U.S. PATENT DOCUMENTS

| | | |
|---|---|---|
| 3,913,949 A | 10/1975 | Senatro |
| 3,915,478 A * | 10/1975 | Al et al. .................. 285/45 |
| 3,924,882 A | 12/1975 | Ellis |
| 3,999,781 A * | 12/1976 | Todd ........................ 285/12 |
| 4,471,978 A | 9/1984 | Kramer |
| 4,475,748 A | 10/1984 | Ekman |
| 4,695,078 A | 9/1987 | Anderson |
| 4,802,695 A * | 2/1989 | Weinhold ................. 285/91 |
| 5,213,375 A * | 5/1993 | Wu .......................... 285/38 |
| 5,362,109 A * | 11/1994 | Pacht ....................... 285/39 |
| 5,441,312 A | 8/1995 | Fujiyoshi et al. |
| 5,466,014 A | 11/1995 | Cummings |
| 5,524,936 A | 6/1996 | Barr et al. |
| 5,887,908 A | 3/1999 | White |
| 6,010,161 A | 1/2000 | Berg |

FOREIGN PATENT DOCUMENTS

| | | | |
|---|---|---|---|
| DE | 79 36 914 | 11/1980 | |
| DE | 37 09 819 | 11/1987 | |
| DE | 37 43 170 | 5/1989 | |
| DE | 195 16 384 | 11/1996 | |
| EP | 0 102 161 | 5/1987 | |
| FR | 1223575 * | 6/1960 | ............ 285/351 |
| FR | 2 284 079 | 4/1976 | |
| GB | 2 129 081 | 5/1984 | |
| GB | 2 228 981 | 9/1990 | |
| JP | 09242950 | 9/1997 | |
| NO | 84284 | 9/1954 | |

* cited by examiner

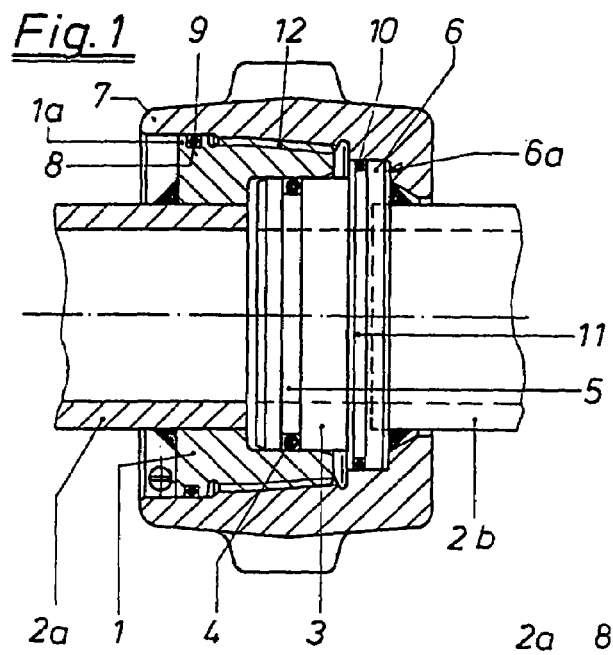
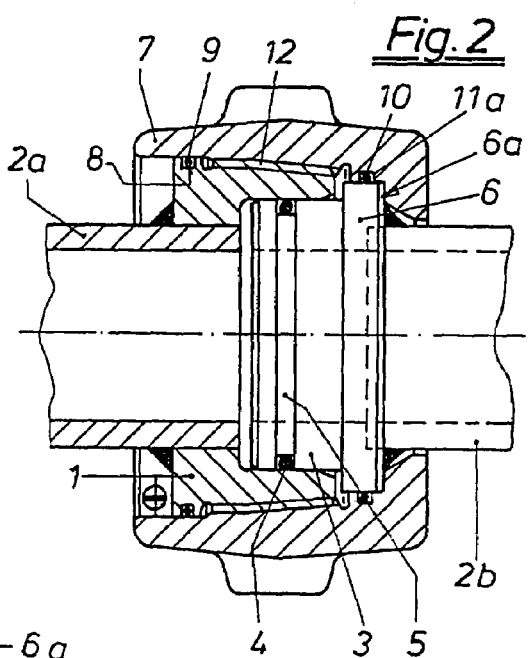
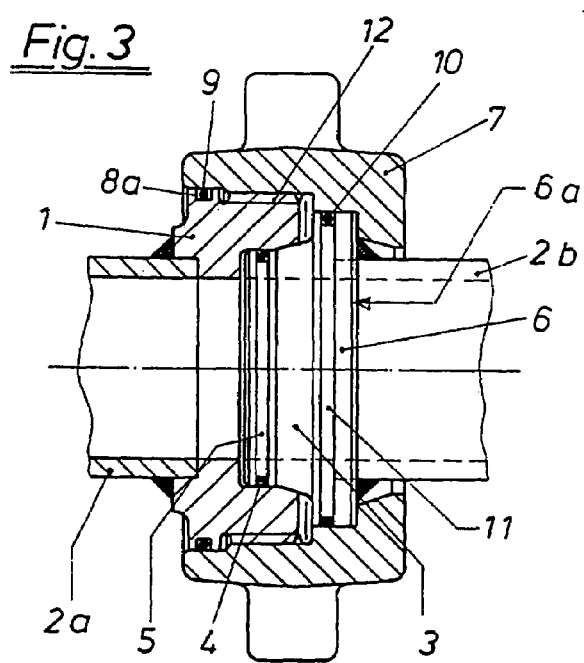

PIPE COUPLING

The present invention is a continuation of, and claims priority of, Ser. No. 10/254,561, filed Sep. 25, 2002 and now abandoned, which, in turn, was a continuation of and claimed priority of Ser No. 09/620,674, filed Jul. 20, 2000 and now abandoned, which, in turn, was a continuation of and claimed priority of Ser. No. 09/047,757, filed Mar. 25, 1998, and now abandoned.

BACKGROUND OF INVENTION

Pipe couplings that are used underground, as in the type disclosed in German Patent 195 16 384, should be easily detachable even after a long periods of use. Problems encountered include the severe atmospheric pollution to which pipe couplings are subjected in underground use, as well as exposure to various gaseous, liquid and solid media.

The measures taken to protect these types of couplings have been insufficient for effective protection against erosion and corrosion of the thread connection between the socket component and union nut in underground applications. This results in the threaded connections seizing, which after prolonged use, either cannot be detached or can only be detached by using great force and destroying the threads.

It is thus an object of the invention to provide measures to effectively avoid damage to the threaded connection between the socket component and the union nut of generic pipe connections. The invention protects the threaded connection after long periods of use, particularly in a polluted environment, such as in underground use, to ensure that the union nut is easily detachable.

SUMMARY OF THE INVENTION

The invention relates to a pipe coupling comprising a socket component and an insert component which is partially insertable to securely fit into the socket component. A ring groove between the socket component and the insert component is sealed by a ring seal. The socket component is releasably connected to the insert component by means of a union nut which contacts a shoulder of the insert component rearwardly for joined movement into the closed position. The union nut is screwed onto the socket component along a cylindrical and/or conical exterior thread. The ring gap between the union nut and the insert component is sealed. The ring gap between the union nut and the socket component is also sealed. The thread connection between the socket component and the union nut is positioned between the two sealing positions.

Preferably, one of the sealing rings is inserted into a ring groove in the exterior circumferential surface of the ring segment of the insert component forming the shoulder and/or in the facing ring surface of the union nut. A second sealing ring is inserted into a ring groove in the exterior circumferential surface at the rear terminal section behind the thread connection on the socket component and/or the facing ring surface of the union nut.

Due to the arrangement of the sealing positions between the thread connection of the socket component and the union nut, neither gaseous nor liquid nor solid particles can enter the thread connection from the surroundings. Consequently, the pipe coupling's proper function remains unaffected and without damage, even after prolonged use, and remains easily detachable.

Other possible embodiments of the invention are shown in the drawings.

BRIEF DESCRIPTION OF THE DRAWINGS

FIG. 1 of the drawings is a partial cross-sectional view of one embodiment of a pipe coupling;

FIG. 2 of the drawings is a partial cross-sectional view of a second embodiment of a pipe coupling;

FIG. 3 of the drawings is a partial cross-sectional view of a third embodiment of a pipe coupling.

DETAILED DESCRIPTION OF THE DRAWINGS

While this invention is susceptible of embodiment in different forms, there is shown in the drawings and will be described herein in detail, three specific embodiments, with the understanding that the present invention is to be considered as an exemplification of the principles of the invention and is not intended to limit the invention to the embodiments illustrated.

In FIGS. 1, 2 and 3, the pipe coupling comprises a socket component 1, welded to the end of one of the pipe sections 2a. The insert component 3 is welded to the end of the facing pipe 2b, with the insert component 3 partially inserted to securely fit into the receiving aperture of the socket component 1. The ring gap between the insert component 3 and the socket component 1 is sealed by a ring seal 4 which, as shown in the Figures, has been inserted into a ring groove 5 in the exterior circumference surface of the insert component 3. The same effect would be achieved if the ring groove is provided in the facing interior circumference surface of the socket component 1. The embodiments shown in the drawings, however, have the advantage that the ring seal 4 is located more positively and with less prestress in the ring groove 5, than to the ring seal which would be provided in the circumferential groove in the socket component 1.

At the ring segment 6 of the insert component 3, a rearward shoulder 6a is formed which provides the contact face for the union nut 7. When installing the pipe coupling, insert component 3 is first inserted into the socket component 1. Union nut 7 is then advanced until its thread engages the socket component 1. By turning union nut 7, it engages the threads of the two coupling halves and by resting against the shoulder 6a of the insert component 3, it pulls the insert component 3 into the socket component 1.

In the embodiment shown in FIG. 1, the threads on the interior circumference surface of the union nut 7 and on the exterior circumference surface of socket component 1 are partly conical and partly cylindrical. The embodiment shown in to FIG. 2 also has the same thread shape. In contrast, the threaded connection 12, in the embodiment shown in FIG. 3, is totally cylindrical.

Each figure depicts different forms of sealing the thread connection 12 between union nut 7 and socket component 1. In the embodiment shown in to FIG. 1, a ring groove 8 is configured in the exterior circumference surface of the terminal section 1a of the socket component 1, with a sealing ring 9 inserted into the said exterior circumference surface. Sealing ring 9 seals the gap between the facing surfaces of the union nut 7 or of the socket component 1, and thus protects the threaded connection 12 between union nut 7 and socket component 1 from intrusion of undesirable media from the surrounding area.

At the facing side, a sealing ring 10 protects the thread section between union nut 7 and socket component 1 from intrusion of undesirable media from the surrounding area. Sealing ring 10 is inserted into a ring groove 11 in the exterior circumference surface of the ring segment 6 of the insert component 3. Sealing rings 9 and 10 are positioned so that the threaded connection 12 between the union nut 7 and the socket component 1 makes it impossible for media from the surrounding area to enter the threaded connection 12 from either side. As an alternative to FIG. 1, FIG. 2 shows the sealing ring 10 positioned on the right in a ring groove 11a in the interior circumference surface of the union nut 7, which is located opposite the ring segment 6 of the insert component 3.

In the embodiment shown in FIG. 3, the sealing ring 9 limiting the thread connection 12 on the left side is located in a ring groove 8a in the interior circumference surface of the union nut 7.

Of course, it is also possible to have arrangements of the sealing rings 9 and 10, as shown in FIGS. 1, 2 and 3.

What is claimed is:

1. A pipe coupling, having a longitudinal axis, comprising:
    a socket component including an exterior thread having at least one of a cylindrical and a conical shape;
    an insert component having a front end and a rear end, which front end is at least partially insertable to securely fit into the socket component;
    the insert component further including an annular shoulder formed at the rear end of the insert component, the annular shoulder including a rear-facing surface;
    the socket component being releasably connected to the insert component by means of a one-piece union nut which bears against the rear-facing surface of the annular shoulder, upon tightening of the union nut, for joined movement of the union nut and the insert component into a closed position, the union nut including an interior thread for matching engagement with the exterior thread on the socket component; and
    a first sealing ring and a second sealing ring for preventing entry of undesired matter into the matched interior and exterior threads, the first sealing ring being radially positioned between the union nut and the insert component and the second sealing ring being radially positioned between the union nut and the socket component, so that the matched interior and exterior thread connection of the socket component and the union nut is positioned between the first and second sealing rings when the union nut operably engages the socket component,
    wherein the second sealing ring is axially captured substantially completely within an annular ring groove, defined by two spaced apart radial walls, in at least one of the exterior circumferential surface of the socket component and the interior surface of the union nut, and wherein the second sealing ring makes contact with the other of the union nut and the socket component along a surface thereof that is substantially parallel to the longitudinal axis.

2. A pipe coupling according to claim 1, wherein the first sealing ring is inserted into an annular ring groove positioned in at least one of the exterior circumferential surface of the annular shoulder and the interior surface of the union nut.

* * * * *